(12) United States Patent
Choi (10) Patent No.: US 11,634,825 B2
(45) Date of Patent: Apr. 25, 2023

(54) ALKALINE WATER ELECTROLYSIS SYSTEM

(71) Applicants: HYUNDAI MOTOR COMPANY, Seoul (KR); KIA CORPORATION, Seoul (KR)

(72) Inventor: Hoon Choi, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 64 days.

(21) Appl. No.: 17/512,370

(22) Filed: Oct. 27, 2021

(65) Prior Publication Data
US 2022/0325424 A1 Oct. 13, 2022

(30) Foreign Application Priority Data
Apr. 12, 2021 (KR) .................. 10-2021-0047147

(51) Int. Cl.
| | | |
|---|---|---|
| *C25B 9/015* | (2021.01) | |
| *C25B 1/04* | (2021.01) | |
| *C25B 9/17* | (2021.01) | |
| *C25B 9/01* | (2021.01) | |
| *C25B 15/023* | (2021.01) | |
| *C25B 9/65* | (2021.01) | |

(Continued)

(52) U.S. Cl.
CPC ............... *C25B 9/015* (2021.01); *C25B 1/04* (2013.01); *C25B 9/01* (2021.01); *C25B 9/05* (2021.01); *C25B 9/17* (2021.01); *C25B 9/65* (2021.01); *C25B 15/023* (2021.01); *C25B 15/08* (2013.01)

(58) Field of Classification Search
CPC .. C25B 9/05; C25B 9/01; C25B 9/015; C25B 9/023; C25B 1/04
See application file for complete search history.

(56) References Cited

U.S. PATENT DOCUMENTS

| | | | |
|---|---|---|---|
| 10,487,408 B2* | 11/2019 | Rothschild | ............... C25B 1/04 |
| 11,005,117 B2* | 5/2021 | Seymour | ............... C25B 15/081 |
| 2014/0363757 A1* | 12/2014 | Jehle | .................. C25B 1/04 |
| | | | 429/515 |

FOREIGN PATENT DOCUMENTS

| | | |
|---|---|---|
| KR | 20130112204 A | 10/2013 |
| RU | 2240381 C1 * | 11/2004 |

OTHER PUBLICATIONS

Machine translation of RU2240381. (Year: 2004).*

* cited by examiner

*Primary Examiner* — Brian W Cohen
(74) *Attorney, Agent, or Firm* — Lempia Summerfield Katz LLC (57) ABSTRACT

An alkaline water electrolysis system includes: a plurality of reaction chambers, each including a main electrode and an auxiliary electrode; a piston provided in each reaction chamber to change a volume of the reaction chamber through reciprocating motion; a drive motor; a connecting rod and a crankshaft installed to change rotational motion of the drive motor into reciprocating linear motion of the piston; a plurality of gas valves installed on an upper side of the reaction chamber to discharge hydrogen and oxygen generated in the reaction chamber through different paths, respectively; a pressure sensor installed in the reaction chamber; a controller configured to open and close the gas valves in response to a signal received from the pressure sensor; and an electrolyte supply apparatus provided to supply an electrolyte to the reaction chambers.

10 Claims, 6 Drawing Sheets

(51) Int. Cl.
*C25B  15/08*    (2006.01)
*C25B  9/05*     (2021.01)

FIG. 1

Prior Art

ALKALINE WATER ELECTROLYSIS SYSTEM

CROSS-REFERENCE TO RELATED APPLICATION

This application claims priority to and the benefit of Korean Patent Application No. 10-2021-0047147, filed on Apr. 12, 2021, in the Korean Intellectual Property Office, the disclosure of which is incorporated herein by reference.

BACKGROUND

1. Field of the Disclosure

The present disclosure relates to the configuration of a water electrolysis system configured to produce hydrogen by electrolyzing water.

2. Description of the Prior Art

In a conventional alkaline water electrolysis system, a separation membrane is provided between two electrodes that are supplied with power. The separation membrane simultaneously performs a role of transferring hydroxide ions and a role of physically separating oxygen and hydrogen during a water electrolysis operation.

Figure 1:
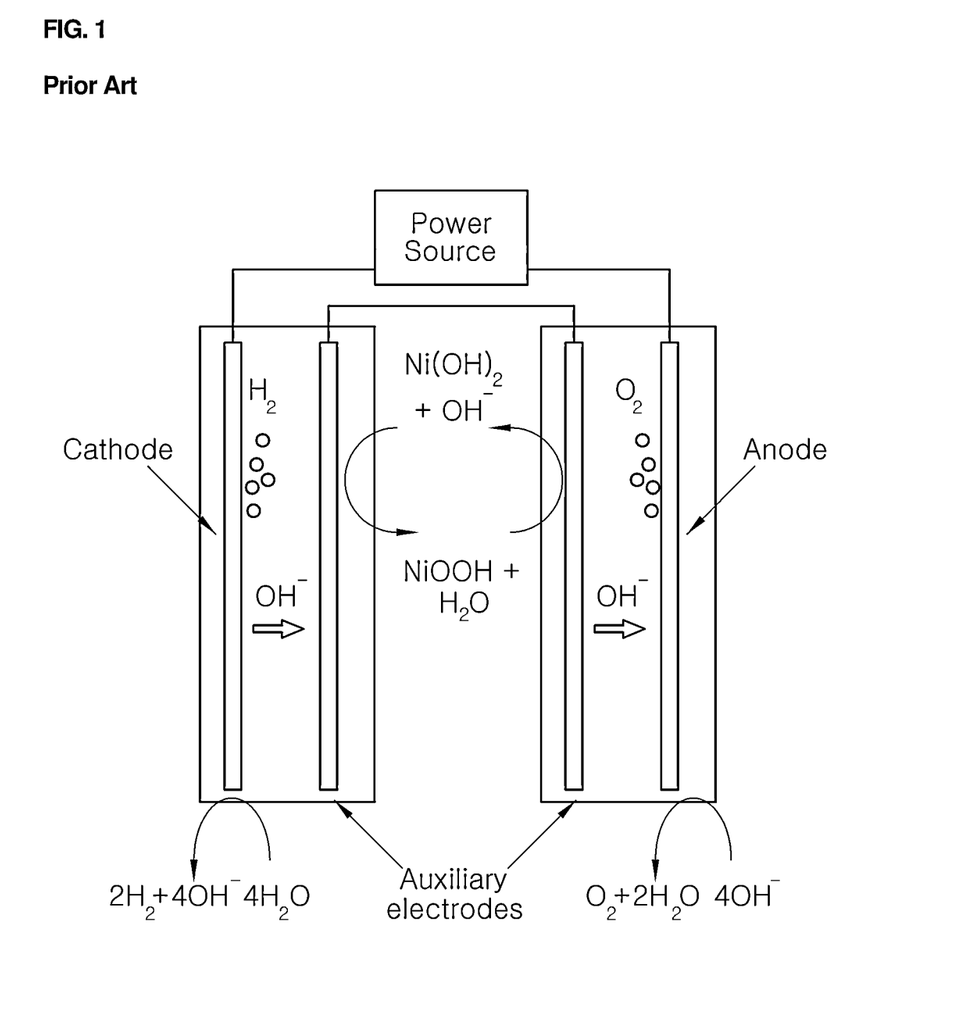
FIG. 1 is a view illustrating the operating principle of a separation-type alkaline water electrolysis system.

The separator as described above is disadvantageous from the aspect of pressurization and has a problem of generation of crossover in a low-load situation. Recently, a separation-type alkaline water electrolysis system using an auxiliary electrode without a separation membrane as illustrated in FIG. 1 has attracted attention.

The separation-type alkaline water electrolysis system generates only hydrogen at the hydrogen electrode and oxygen at the oxygen electrode. However, the separation-type alkaline water electrolysis system is advantageous in that, when the polarity of the power source is reversed, the separation-type alkaline water electrolysis system operates in the opposite direction, so that when hydrogen is generated in one tank, oxygen is generated in the other tank. In addition, since there is no separation membrane, pressurization is facilitated, and there is a remarkably low risk of mixing between the generated hydrogen and oxygen.

It should be understood that the foregoing description of the background art is provided merely for the purpose of promoting an understanding of the background of the present disclosure, and should not be accepted as acknowledging that the background art is known to those having ordinary skill in the art.

SUMMARY

In view of the foregoing, the present disclosure provides an alkaline water electrolysis system capable of producing hydrogen with a simple configuration and at a low equipment cost by enabling hydrogen produced through a separate alkaline water electrolysis method to be pressurized and stored without separate compression equipment.

In an aspect of the present disclosure, an alkaline water electrolysis system includes: a plurality of reaction chambers, each including a main electrode and an auxiliary electrode; a piston provided in each reaction chamber to change the volume of the reaction chamber through reciprocating motion; a drive motor; a connecting rod and a crankshaft installed to change the rotational motion of the drive motor into reciprocating linear motion of the piston; a plurality of gas valves installed on the upper side of the reaction chamber to discharge hydrogen and oxygen generated in the reaction chamber through different paths, respectively; a pressure sensor installed in the reaction chamber; a controller configured to open and close the gas valves in response to a signal received from the pressure sensor; and an electrolyte supply apparatus provided to supply an electrolyte to the reaction chambers.

An even number of reaction chambers are provided. When two reaction chambers, which are provided with main electrodes relatively connected to a positive electrode and a negative electrode of the power source device, among the main electrodes of the reaction chambers, are interlocking chambers, the pistons of the interlocking chambers may be installed to be linearly reciprocated in the same phase by the crankshaft.

Auxiliary electrodes of the interlocking chambers are electrically connected to each other.

The electrolyte supply apparatus may include an electrolyte reservoir configured to store the electrolyte and may include an electrolyte valve provided to switch a state of supply of the electrolyte from the electrolyte reservoir to each of the reaction chambers.

The gas valve may include a hydrogen valve configured to discharge hydrogen and an oxygen valve configured to discharge oxygen. The controller may be configured to selectively open the hydrogen valve and the oxygen valve depending on whether the gas generated in the reaction chamber is hydrogen or oxygen when the pressure measured by the pressure sensor is equal to or higher than a predetermined reference pressure.

The alkaline water electrolysis system may further include: a hydrogen gas-liquid separator configured to separate the electrolyte from a fluid discharged through the hydrogen valve and to recover the separated electrolyte to the electrolyte reservoir; and an oxygen-gas/liquid separator configured to separate the electrolyte from a fluid discharged through the oxygen valve and to recover the separated electrolyte to the electrolyte reservoir.

The power source device may be configured to alternately change the polarity of the main electrodes of the interlocking chambers every time the pistons reciprocate in conjunction with the rotation of the crankshaft.

The power source device may include: a switching shaft installed to rotate once every two rotations of the crankshaft; two slip rings installed on the switching shaft and each connected to an external DC power source; two arc-shaped electrodes electrically connected to the two slip rings, respectively, and provided on a circumferential surface of the switching shaft so as to be spaced apart from each other along a circumferential direction; and brushes disposed to face each other so as to form an electrical contact state with the two arcuate electrodes and connected to the main electrodes of the interlocking chambers, respectively.

The reaction chamber may include a cylinder in which the piston linearly slides.

The reaction chamber may include: a diaphragm installed to be deformed by linear reciprocating motion of the piston; and a shell configured to support the diaphragm and define a space with the diaphragm.

According to the present disclosure, it is possible to produce hydrogen with a simple configuration and at a low equipment cost by allowing hydrogen produced through a separate alkaline water electrolysis method to be pressurized and stored without separate compression equipment.

BRIEF DESCRIPTION OF THE DRAWINGS

The above and other aspects, features, and advantages of the present disclosure should be more apparent from the following detailed description taken in conjunction with the accompanying drawings, in which.

DETAILED DESCRIPTION OF THE EMBODIMENTS

A specific structural or functional description of embodiments of the present disclosure disclosed in the specification or application is given merely for the purpose of describing the embodiments according to the present disclosure. Therefore, the embodiments according to the present disclosure may be implemented in various forms, and the present disclosure should not be construed as being limited to the embodiments described in the specification or application.

Various changes and modifications may be made to the embodiments according to the present disclosure and, therefore, particular embodiments are illustrated in the drawings and described in the specification or application. However, it should be understood that embodiments according to the concept of the present disclosure are not limited to the particular disclosed embodiments, but that the present disclosure includes all modifications, equivalents, and alternatives falling within the spirit and scope of the present disclosure.

Such terms as "a first" and/or "a second" may be used to described various elements, but the elements should not be limited by these terms. These terms are intended merely to distinguish one element from other elements. For example, a first element may be named a second element and similarly a second element may be named a second element without departing from the scope of protection of the present disclosure.

In the case where an element is referred to as being "connected" or "accessed" to other elements, it should be understood that not only the element may be directly connected or accessed to the other elements, but also another element may exist between them. Contrarily, in the case where a component is referred to as being "directly connected" or "directly accessed" to any other component, it should be understood that there is no component therebetween. The other expressions of describing a relation between structural elements, i.e. "between" and "merely between" or "neighboring" and "directly neighboring", should be interpreted similarly to the above description.

The terms used in the present disclosure are merely used to describe specific embodiments and are not intended to limit the present disclosure. A singular expression may include a plural expression unless they are definitely different in a context. As used herein, the expressions "include" or "have" are intended to specify the existence of mentioned features, numbers, steps, operations, elements, components, or combinations thereof. These expressions should be construed as not precluding the possible existence or addition of one or more other features, numbers, steps, operations, elements, components, or combinations thereof.

Unless defined otherwise, all terms used herein, including technical and scientific terms, have the same meaning as those commonly understood by a person having ordinary skill in the art to which the present disclosure pertains. Such terms as those defined in a generally used dictionary may be interpreted to have the meanings consistent with the contextual meanings in the relevant field of art. Such terms are not to be interpreted to have ideal or excessively formal meanings unless clearly defined in the present disclosure.

When a component, device, element, or the like of the present disclosure is described as having a purpose or performing an operation, function, or the like, the component, device, or element should be considered herein as being "configured to" meet that purpose or to perform that operation or function.

Hereinafter, embodiments of the present disclosure are described in detail with reference to the accompanying drawings. The same or like reference signs presented in the drawings designate the same or like elements.

Referring to FIGS. 2-5, an alkaline water analysis system of an embodiment of the present disclosure includes: a plurality of reaction chambers 5, each of which is provided with a main electrode 1 and an auxiliary electrode 3; a piston 7 provided in each reaction chamber 5 to change the volume of the reaction chamber 5 through reciprocating motion; a drive motor 9; a connecting rod 11 and a crankshaft 13 installed to change the rotational motion of the drive motor 9 into reciprocating linear motion of the piston 7; a plurality of gas valves 15 installed at an upper side of each reaction chamber 5 so as to discharge hydrogen and oxygen generated in the reaction chamber 5 through different paths, respectively; a pressure sensor 17 installed on the reaction chamber 5; a controller 19 configured to open/close the gas valves 15 in response to a signal received from the pressure sensor 17; and an electrolyte supply apparatus provided to supply an electrolyte to the reaction chambers 5.

The discharged hydrogen and oxygen are separately stored in a hydrogen tank 21 and an oxygen tank 23, respectively.

In other words, according to the present disclosure, electricity is supplied to the main electrodes 1 to generate hydrogen and oxygen in the state in which the main electrodes 1 and the auxiliary electrodes 3 of the reaction chambers 5 are immersed in the electrolyte. The hydrogen and oxygen generated thereby are allowed to be discharged by selectively operating the gas valve 15 while pressurizing the pistons 7. As a result, it is possible to completely separate, pressurize, and store the hydrogen and oxygen without using a separate compressor.

An even number of reaction chambers 5 are provided. When two reaction chambers 5 provided with main electrodes 1 relatively connected to the positive electrode and the negative electrode of the power source device 16 among the main electrodes 1 of the reaction chambers 5 are interlocking chambers, the pistons 7 of the interlocking chambers are installed to be linearly reciprocated in the same phase by the crankshaft 13.

Figure 3:
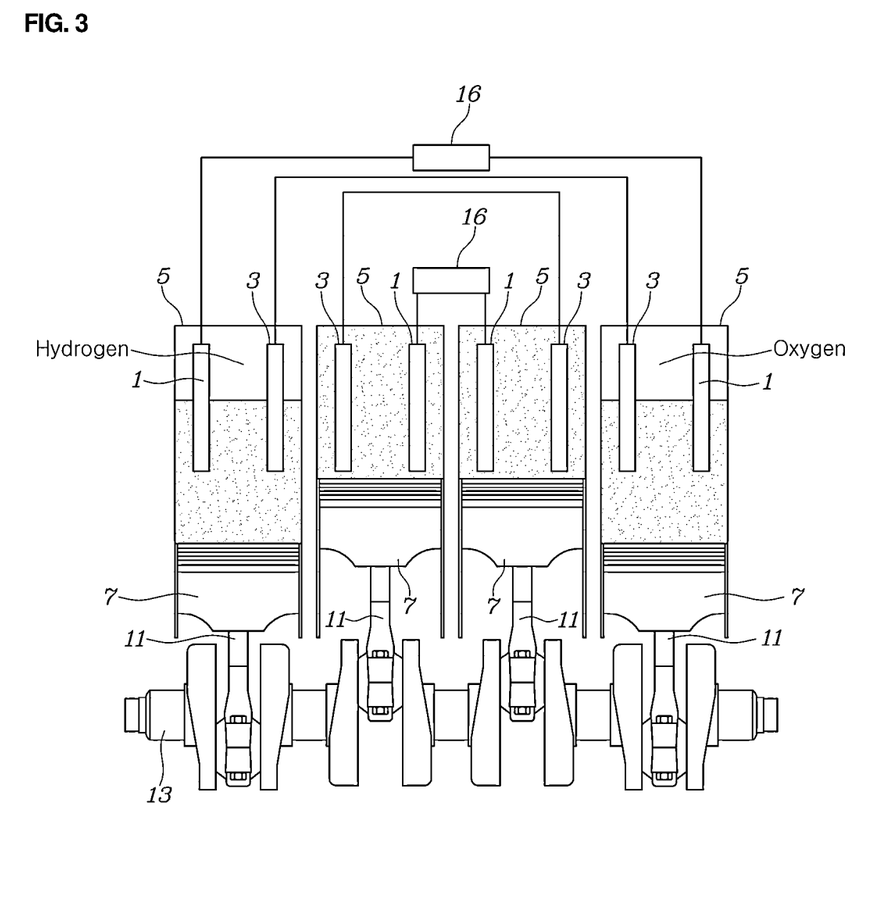
FIG. 3 is a view illustrating a connection structure of a power source device between interlocking chambers of the water electrolysis system of FIG. 2.

For example, as illustrated in FIG. 3, when four reaction chambers 5 are provided, two outer reaction chambers 5 constitute one pair of interlocking chambers, two inner reaction chambers 5 constitute another pair of interlocking chambers, and the pistons 7 of each pair of interlocking chambers are coupled to the crankshaft 13 so as to move up and down together in the same phase.

As illustrated, the auxiliary electrodes 3 of each pair of interlocking chambers are electrically connected to each other via conducting wires or the like.

The reaction chambers 5 may be arranged in a linear arrangement as illustrated, or may be arranged in a V shape, like a V-type engine. Furthermore, almost all arrangements used for conventional pistons 7 in reciprocating engines will be possible.

Figure 2:
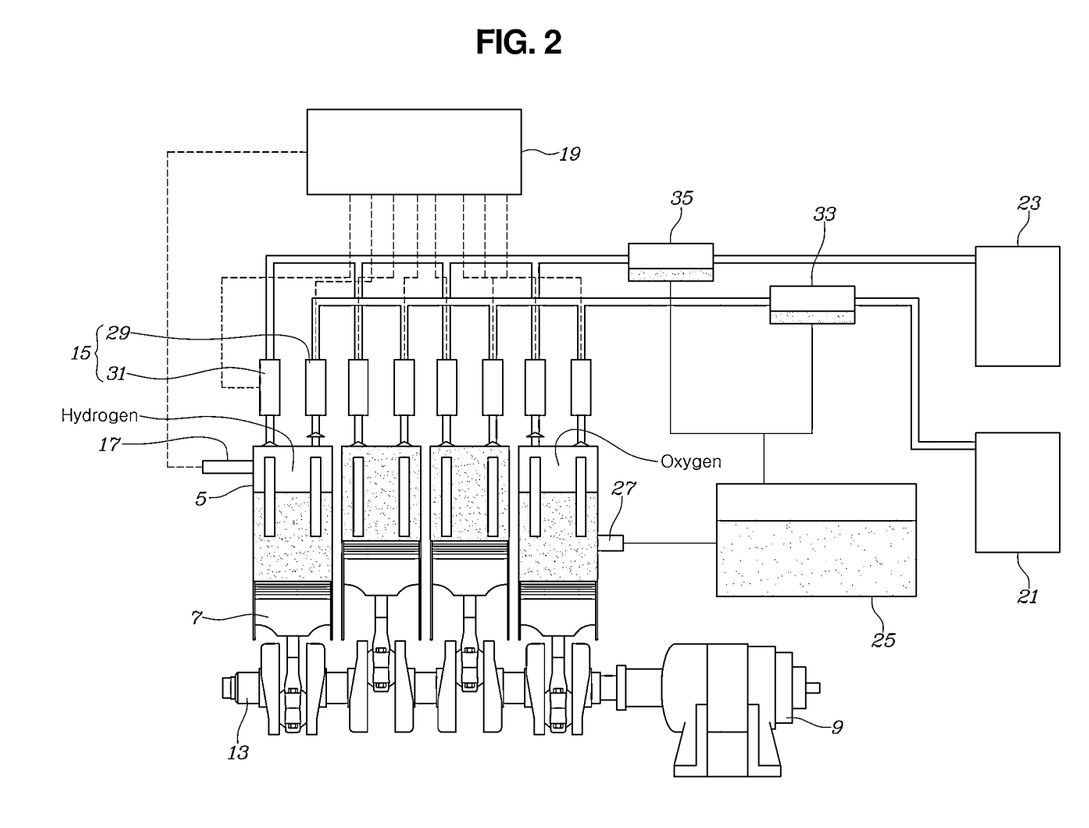
FIG. 2 is a view illustrating the configuration of an alkaline water electrolysis system according to the present disclosure.

Meanwhile, the drive motor 9 is preferably installed so as to rotate the crankshaft 13 in a sufficiently decelerated state through a reducer or the like.

The electrolyte supply apparatus may include an electrolyte reservoir 25 configured to store an electrolyte and an electrolyte valve 27 provided to switch the state of supply of the electrolyte supplied from the electrolyte reservoir 25 to each of the reaction chambers 5.

The electrolyte valve 27 is mechanically opened only when the piston 7 in each reaction chamber 5 descends and the volume of the reaction chamber 5 expands downwards, thereby allowing the electrolyte to be supplied using the pressure difference between atmospheric pressure and the pressure of the reaction chamber 5, without requiring a separate pump. The electrolyte valve 27 may be configured to be electronically controlled by the controller 19.

For reference, only one electrolyte valve 27 is illustrated in FIG. 2, but one electrolyte valve 27 is individually installed in each of the remaining reaction chambers 5.

Figure 4:
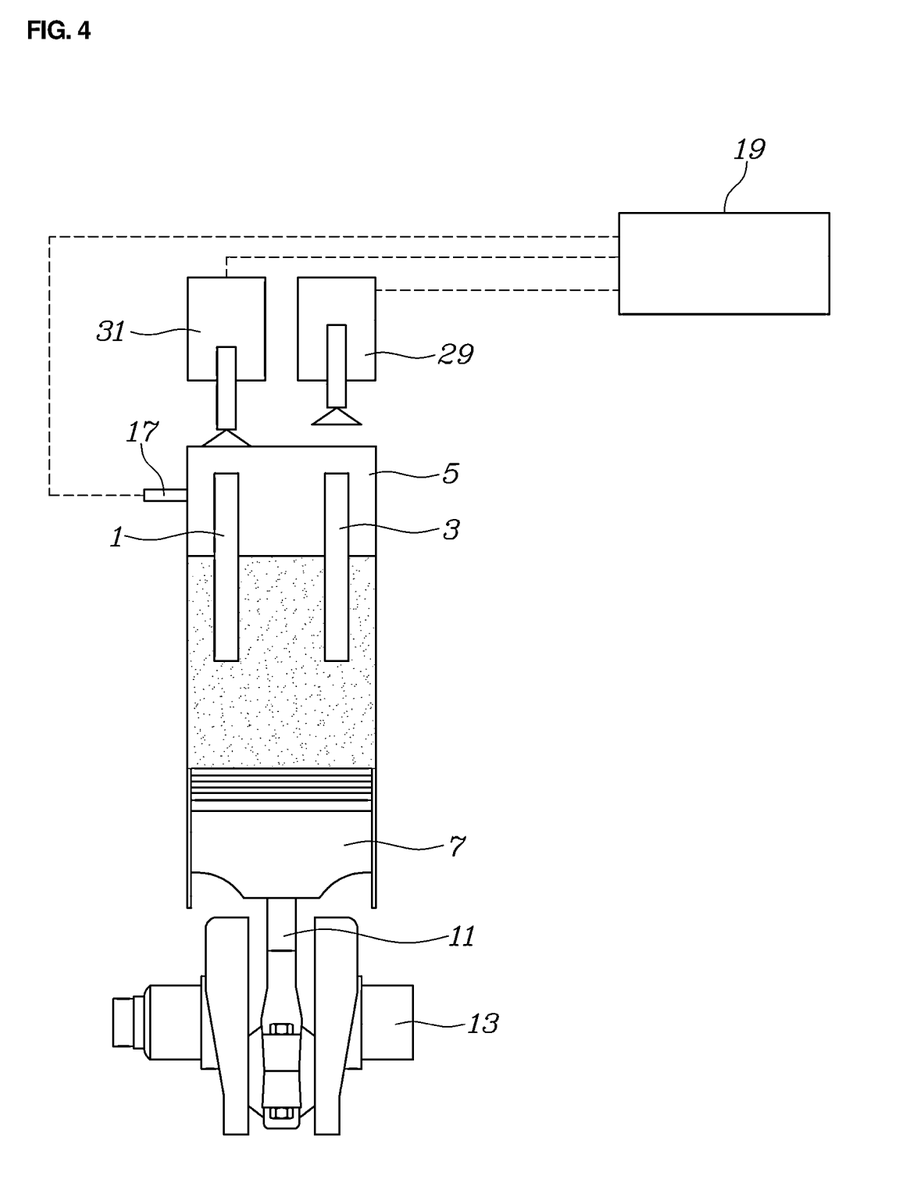
FIG. 4 is a view illustrating a plurality of gas valves and pressure sensors provided in one reaction chamber of the water electrolysis system of FIG. 2.

The gas valves 15 include a hydrogen valve 29 configured to discharge hydrogen and an oxygen valve 31 configured to discharge oxygen. When the pressure measured by the pressure sensor 17 is equal to or higher than a predetermined reference pressure, the controller 19 selectively opens the hydrogen valve 29 and the oxygen valve 31 depending on whether the gas generated in the reaction chambers 5 is hydrogen or oxygen so that the hydrogen or oxygen is stored in the hydrogen tank 21 or the oxygen tank 23 at a desired pressure.

In other words, when hydrogen is being generated in one reaction chamber 5 and the pressure in the reaction chamber 5 increases up to the reference pressure as the piston 7 of the reaction chamber 5 rises, the controller 19 opens the hydrogen valve 29 to pump compressed hydrogen to the hydrogen tank 21 and store the hydrogen in the hydrogen tank 21.

Therefore, it is preferable to set the reference pressure to be slightly higher than the pressure of the hydrogen to be stored in the hydrogen tank 21, so that when the hydrogen valve 29 is opened, the hydrogen in the reaction chamber 5 spontaneously moves to the hydrogen tank 21.

Meanwhile, when this alkaline water electrolysis system is used only for production of hydrogen at high pressure and the pressurization of oxygen is not important, the controller 19 may open the oxygen valve 31 from the time point at which the piston 7 starts to rise from the bottom dead center, thereby driving the drive motor 9 in a manner that minimizes power loss.

For reference, the hydrogen valve 29 and the oxygen valve 31 may be configured using solenoid valve devices electrically operated by the controller 19.

In addition, the alkaline water electrolysis system of the present disclosure may further include: a hydrogen gas-liquid separator 33 configured to separate the electrolyte from the fluid discharged through the hydrogen valve 29 and to recover the separated electrolyte to the electrolyte reservoir 25; and an oxygen-gas/liquid separator 35 configured to separate the electrolyte from the fluid discharged through the oxygen valve 31 and to recover the separated electrolyte to the electrolyte reservoir 25.

In other words, because the electrolyte can be discharged together through the gas valve 15 when the hydrogen or oxygen generated as described above is discharged to the outside of the reaction chamber 5, the electrolyte discharged in this way is separated from hydrogen or oxygen for reuse, and only pure hydrogen and oxygen are stored in the hydrogen tank 21 and the oxygen tank 23.

Of course, a mist separator or the like may be additionally provided for more reliable separation of the electrolyte.

Figure 5:
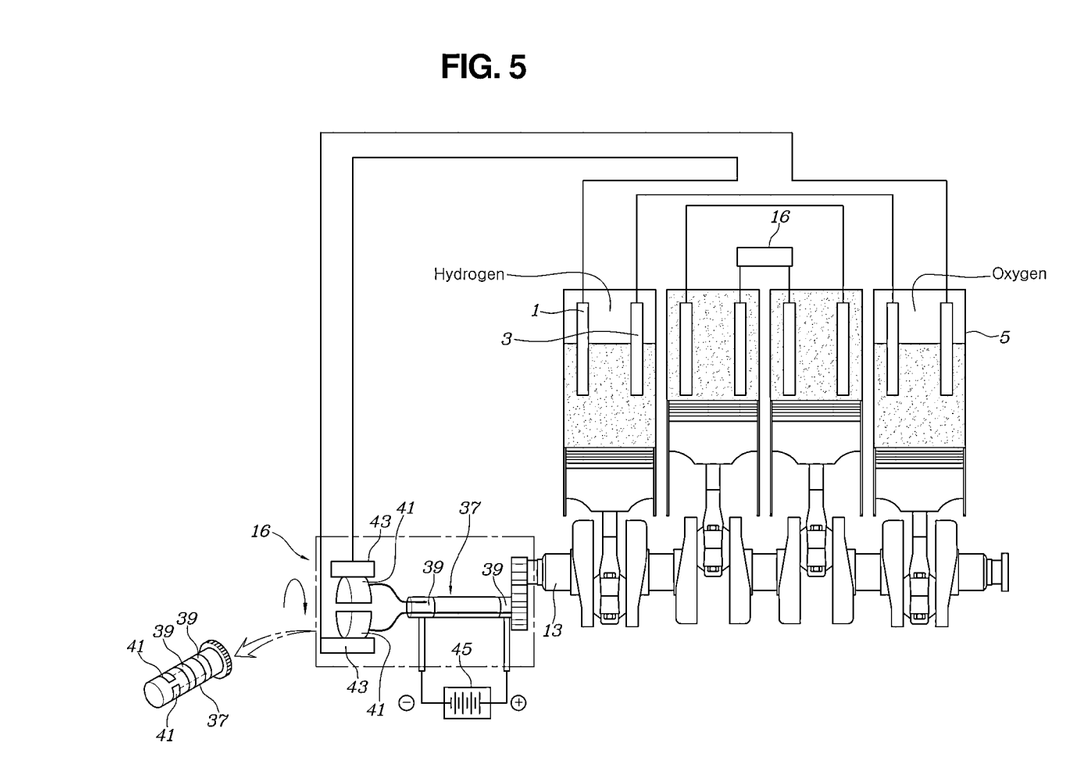
FIG. 5 is a view illustrating a connection structure of a power source device of the water electrolysis system of FIG. 2.

In this embodiment, the power source device 16 is configured to alternately change the polarity of the main electrodes 1 of the interlocking chambers every time the pistons 7 reciprocate in conjunction with the rotation of the crankshaft 13.

In other words, as illustrated in FIG. 5, the power source device 16 may include: a switching shaft 37 installed to rotate once every two rotations of the crankshaft 13; two slip rings 39 installed on the switching shaft 37 and each connected to an external DC power source 45; two arc-shaped electrodes 41 electrically connected to the two slip rings 39, respectively, and provided on the circumferential surface of the switching shaft 37 so as to be spaced apart from each other along a circumferential direction; and brushes 43 disposed to face each other so as to form an electrical contact state with the two arcuate electrodes 41 and connected to the main electrodes 1 of the interlocking chambers, respectively.

As illustrated, the switching shaft 37 may be connected to the crankshaft 13 at a speed ratio of 1:2 via a gear, a chain, a belt, or the like. Also, the two slip rings 39 may maintain a state of continuous contact with the external DC power source 45 when the switching shaft 37 rotates so that the DC power source 45 is continuously connected to the two arc-shaped electrodes 41. Further, the two arcuate electrodes 41 may supply electricity to the brushes 43 while rotating together with the switching shaft 37. Thus, every time the crankshaft 13 rotates once, the electrodes of the DC power source device 45 are changed and connected to the brushes 43.

Therefore, the two main electrodes 1 of the interlocking chambers connected via the power source device 16 change every time the crankshaft 13 rotates. Thus, when the crankshaft 13 rotates once, hydrogen is generated in one reaction chamber 5 of the interlocking chambers and oxygen is generated in the other reaction chamber 5, and during the next rotation of the crankshaft 13, oxygen is generated in the reaction chamber 5 in which hydrogen was previously generated and hydrogen is generated in the reaction chamber 5 in which oxygen was previously generated. These processes are repeated.

For reference, here, the power source device 16 is conceptually different from the external DC power source 45 and is a device that functions to electrically connect the external DC power source 45 to the main electrodes 1.

For example, in FIG. 5, the power source 16 described above is connected to the interlocking chambers formed by the two outer reaction chambers 5. The power source 16 described above is also additionally connected to the interlocking chambers formed by the two inner reaction chambers 5. Here, this is simply indicated by a box.

Of course, the power source device 16 may be configured not to have a mechanical switching structure as described above, but as an electronic control type. In this case, it will be possible to configure the controller 19 to control the power source device 16 as well.

In the alkaline water electrolysis system configured and operated as described above, when the DC power source 45 is connected to one pair of interlocking chambers by the power source 16, hydrogen and oxygen are respectively generated in the two reaction chambers 5 constituting the pair of interlocking chambers. At this time, when the crankshaft 13 is rotated by the drive motor 9 to pressurize the hydrogen and oxygen generated as described above, and then the hydrogen valve 29 and the oxygen valve 31 are opened, it is possible to store the pressurized hydrogen and oxygen in the hydrogen tank 21 and the oxygen tank 23, respectively.

When the alkaline water electrolysis system of the present disclosure is operated as described above, the reaction chambers 5 are continuously replenished with an electrolyte as described above, and some of the electrolyte is circulated through the electrolyte reservoir 25 via the gas valves 15, thereby cooling the reaction chambers 5. Thus, the alkaline water electrolysis system does not require a separate cooling system.

Figure 6:
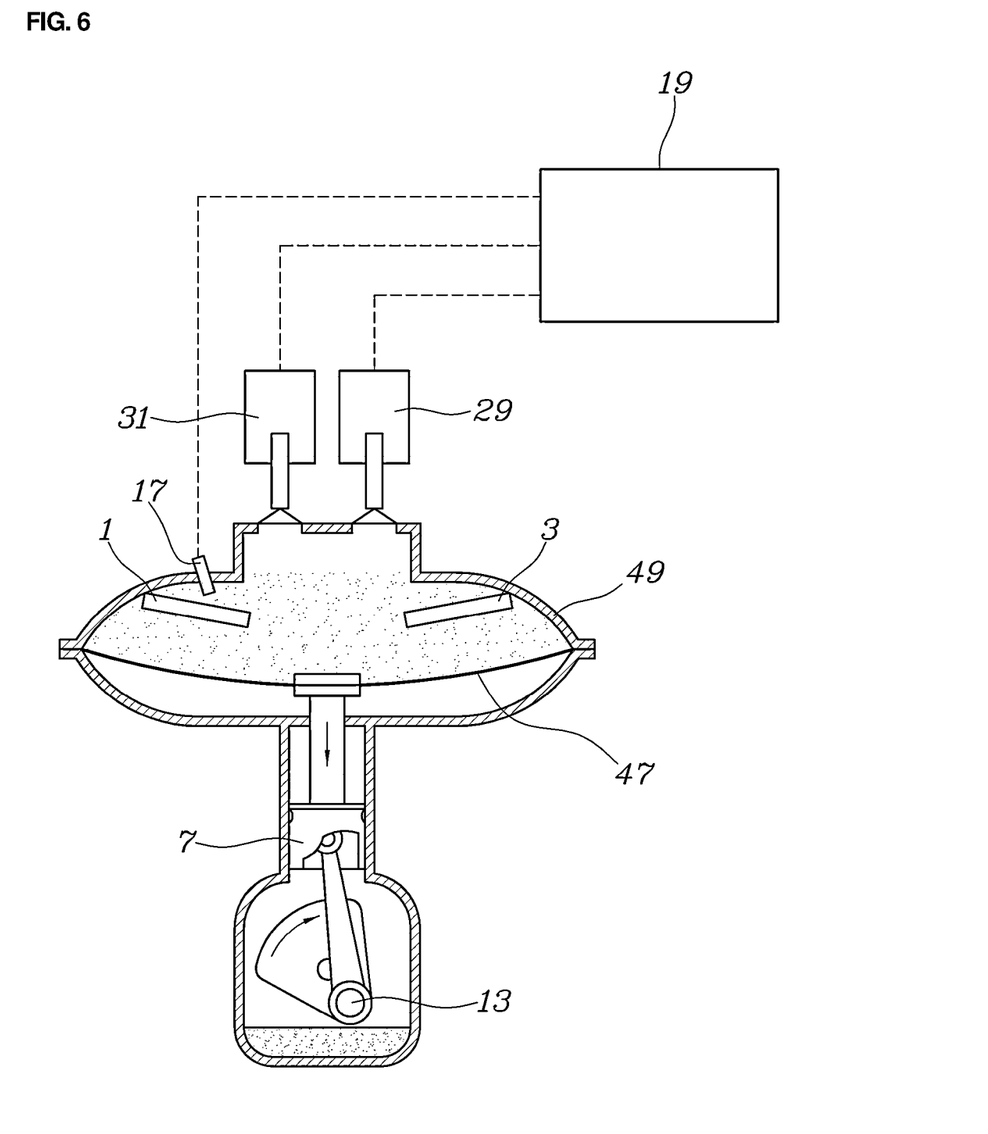
FIG. 6 is a view illustrating another embodiment of the present disclosure, in which an example in which a reaction chamber is constituted with a diaphragm and a shell is illustrated.

Meanwhile, in the embodiment of FIGS. 2-5, each reaction chamber 5 is configured as a cylinder in which the piston 7 linearly slides, but the reaction chamber 5 may be configured differently, as illustrated in FIG. 6.

In other words, the cover 5 may include a diaphragm 47 installed to be deformed by the linear reciprocating motion of the piston 7 and may include a shell 49 configured to support the diaphragm 47 and to define a space together with the diaphragm 47.

In this case, compared to the case in which the reaction chamber 5 is configured as a cylinder, it is possible to more easily and effectively prevent the leakage of electrolyte, hydrogen, and oxygen.

Although the present disclosure has been described and illustrated in conjunction with particular embodiments thereof, it should be apparent to those having ordinary skill in the art that various improvements and modifications may be made to the present disclosure without departing from the technical idea of the present disclosure defined by the appended claims.

What is claimed is:

1. An alkaline water electrolysis system comprising:
   a plurality of reaction chambers each including a main electrode and an auxiliary electrode;
   a piston provided in each reaction chamber to change a volume of the reaction chamber through reciprocating motion;
   a drive motor;
   a connecting rod and a crankshaft installed to change rotational motion of the drive motor into reciprocating linear motion of the piston;
   a plurality of gas valves installed on an upper side of the reaction chamber to discharge hydrogen and oxygen generated in the reaction chamber through different paths, respectively;
   a pressure sensor installed in the reaction chamber;
   a controller configured to open and close the gas valves in response to a signal received from the pressure sensor; and
   an electrolyte supply apparatus provided to supply an electrolyte to the reaction chambers.

2. The alkaline water electrolysis system of claim 1, wherein the plurality of reaction chambers comprises an even number of reaction chambers in which two reaction chambers are interlocking chambers, wherein one main electrode of the two reaction chambers is connected to a positive electrode and another main electrode of the two reaction chambers is connected to a negative electrode of a power source device, respectively, and wherein the pistons of the interlocking chambers are installed to be linearly reciprocated in a same phase by the crankshaft.

3. The alkaline water electrolysis system of claim 2, wherein auxiliary electrodes of the interlocking chambers are electrically connected to each other.

4. The alkaline water electrolysis system of claim 3, wherein the electrolyte supply apparatus comprises:
   an electrolyte reservoir configured to store the electrolyte; and
   an electrolyte valve provided to switch a state of supply of the electrolyte supplied from the electrolyte reservoir to each of the reaction chambers.

5. The alkaline water electrolysis system of claim 4, wherein the gas valve comprises a hydrogen valve configured to discharge hydrogen and an oxygen valve configured to discharge oxygen, and
   wherein the controller is configured to selectively open the hydrogen valve and the oxygen valve depending on whether the gas generated in the reaction chamber is hydrogen or oxygen when the pressure measured by the pressure sensor is equal to or higher than a predetermined reference pressure.

6. The alkaline water electrolysis system of claim 5, further comprising:
   a hydrogen gas-liquid separator configured to separate the electrolyte from a fluid discharged through the hydrogen valve and to recover the separated electrolyte to the electrolyte reservoir; and
   an oxygen-gas/liquid separator configured to separate the electrolyte from a fluid discharged through the oxygen valve and to recover the separated electrolyte to the electrolyte reservoir.

7. The alkaline water electrolysis system of claim 3, wherein the power source device is configured to alternately change a polarity of the main electrodes of the interlocking chambers every time the pistons reciprocate in conjunction with rotation of the crankshaft.

8. The alkaline water electrolysis system of claim 7, wherein the power source device comprises:
   a switching shaft installed to rotate once every two rotations of the crankshaft;
   two slip rings installed on the switching shaft and each connected to an external DC power source;
   two arc-shaped electrodes electrically connected to the two slip rings, respectively, and provided on a circumferential surface of the switching shaft to be spaced apart from each other along a circumferential direction; and
   brushes disposed to face each other so as to form an electrical contact state with the two arcuate electrodes and connected to the main electrodes of the interlocking chambers, respectively.

9. The alkaline water electrolysis system of claim 1, wherein the reaction chamber comprises a cylinder in which the piston linearly slides.

10. The alkaline water electrolysis system of claim 1, wherein the reaction chamber comprises:
    a diaphragm installed to be deformed by linear reciprocating motion of the piston; and
    a shell configured to support the diaphragm and define a space with the diaphragm.

* * * * *